United States Patent

[11] 3,620,783

[72] Inventors Ernst Mahler
  Wiesbaden-Bierstadt;
  Erich Becker, Oberdollendorf; Hansulrich Czapla, Romlinghoven; Fritz Klasse, Winkel, Rhine; Ulrich Ehrcke, Wiesbaden, all of Germany
[21] Appl. No. 722,177
[22] Filed Apr. 18, 1968
[45] Patented Nov. 16, 1971
[73] Assignee Didier-Werke A.G.
  Wiesbaden, Germany
[32] Priority June 3, 1967
[33] Great Britain
[31] 25,733/67

[54] SILICA REFRACTORY MATERIAL
  7 Claims, No Drawings
[52] U.S. Cl. .................................................. 106/69
[51] Int. Cl. .......................................... C04b 35/14
[50] Field of Search ...................................... 106/69

[56] References Cited
  UNITED STATES PATENTS
  3,024,122  3/1962  McCreight et al. ............ 106/69
  3,144,345  8/1964  McCreight et al. ............ 106/69
  3,236,665  2/1966  King ............................... 106/69

Primary Examiner—James E. Poer
Attorney—Brumbaugh, Graves, Donohue & Raymond

ABSTRACT: A silica refractory material, void of heavy metal oxides, contains over 95% of $SiO_2$ and not more than 3% CaO both by weight. Its bulk density is over 1.90 gr. per cc., and its total porosity is under 20 percent (preferably 18.5 to 19 percent). Its thermal conductivity is over 2.0 cal. per m.hr. °C. at a test temperature of 1,200° C. It is produced by mixing the $SiO_2$ (preferably quartzite) with CaO in any suitable form (and preferably lime) in the required proportions, subjecting the mass to a compressure pressure which increases, throughout an increase period of more than 10 seconds, to at least 700 kg. per sq. cm., whereby air is excluded, and firing the compressed mixture at a temperature which increases slowly from 1,300° to 1,500° C. and holding that maximum temperature for not less than 35 hours.

The material is characterized by high-thermal conductivity, high-bulk density, low porosity, and marked dimensional stability at high temperatures. It is suitable for refractory bricks, particularly for use in lining the chambers of coke ovens.

SILICA REFRACTORY MATERIAL

CROSS-REFERENCE TO RELATED APPLICATIONS

Reference is made to British Pat. Application No. 25733/67 of June 3, 1967, by Didier-Werke A.G. from which priority is claimed.

In coke ovens the heat has to be transmitted from the flame through relatively thick refractory walls, normally made of silica bricks, to the coking coal. Such bricks do not have a particularly high thermal conductivity, which is one of the principal factors limiting the output of such ovens.

Attempts have therefore been made to improve the thermal conductivity of such bricks by the addition of heavy metal oxides e.g. Cu O or Ti $O_2$. This method has however, important drawbacks, particularly in view of the very long life demanded of the lining.

Experience has shown the Cu O is not stable in the reducing atmosphere of the coking chamber at very high temperature and that volatile copper compounds are formed. This can lead in the course of time to a weakening of the bricks due to partial destruction of the bond between the refractory silica grains.

With Ti $O_2$ there is the danger, that it acts as a catalysing agent and promotes the formation of graphite in the coking chamber, which is undesirable. Titanium oxide is also very expensive.

It is an object of this invention to improve the thermal conductivity of silica bricks without the use of additives for this purpose.

It has been found that, contrary to expectation in this long established art, a substantial improvement in the thermal conductivity of silica bricks can be achieved, without the addition of heavy metal oxides, merely by changing certain physical characteristics.

The essential characteristic of silica bricks according to the invention is their high bulk density and low porosity whereas retaining their dimension at stability at very high temperature. This problem of combining these features was not solved in the past, due to the known characteristic of silica bricks to grow when fired at temperatures above 1,400° C. This is caused by the conversion of the remaining quartz into crystobalite. A brick of high bulk density could therefore, only be produced by firing it at relatively low temperature. This however, leads to growth of the brick under operating conditions which is dangerous and must be avoided for use in coke ovens and the like.

A silica brick according to the present invention contains over 95 percent of $SiO_2$ and not more than 3 percent CaO both by weight. Its bulk density is over 1.90 gr. per cc., and under certain conditions even over 1.92 gr. per cc., with a total porosity under 20 percent (and preferably only 18.5 to 19 percent which corresponds to a specific gravity of the solid matrix of 2.35). Its thermal conductivity is over 2.0, and under certain conditions over 2.05 K. cal. per m. hr. ° C., at a test temperature of 1,200° C., whereas the best values so far obtained in conventional high quality silica bricks suitable for coke ovens was 1.75 to 1.80. Whereas the absolute values of the conductivity at these high temperatures are known to be dependent on the test method employed, this would not affect the relative improvement in conductivity which is of the order of 15 percent.

The thermal conductivity is determined by a relative test method, where the constant heat flow through two cylindrical disk samples is measured. The disk of the test material is set upon the disk of the standard material and the constant heat flow is established parallel to the cylinder axis. This stationary method is described in Berichte der Deutschen Keramischen Gesellschaft Og. 1957/P.183–189 and in Tonindustrie 1957/P249C256.

The maximum error is about ±3 percent.

The brick according to the invention has preferably a growth of less than 0.5 percent when fired at a temperature of 1,600° C. for several hours. It has also preferably a gas permeability of less than 5 Nanoperm when tested according to the German Standard DIN 51058.

Bricks with the above characteristics can be manufactured according to the following method.

The raw material preferably quartzite, suitable to ensure a Si $O_2$- content exceeding 95 percent in the finished brick is crushed and ground to a maximum grain size of about 3 mm. in the conventional manner. No more than 3 percent CaO in any suitable form, preferably lime, is added as a binding agent. This mass is compressed in a suitable press to maximum pressure of 700 to 1,000 kg. per sq. cm. While this is a usual procedure, it is essential, according to the invention, to slow down the compression to such an extent that substantially all the air included in the mass has had a chance to escape, so that at the end of the compression stroke the air remaining in the pores is at a low, preferably substantially atmospheric, pressure. Assuming a brick of 12 cm. height (in the direction of the compression stroke) it is conventional to allow 5 to 10 seconds from the moment when the die touches the mass to the development of full pressure. This time has always been considered ample for allowing air to escape. Surprisingly, it was discovered that the deaeration does not proceed far enough during this period. It was found that for the example a duration of as much as 40 seconds has to be allowed. Though this may only be part of the explanation, it is thought that during the conventional procedure, very small pockets of occluded air at high pressure remain locked in the green brick. In consequence the expansion of this air during the firing process tends to loosen up the structure of the brick. The result is relatively low bulk density, and often also a brick showing internal fissures at right angles to the compression stroke. It will be appreciated that this increases the thermal resistance of the brick to the transmission of heat.

These drawbacks are avoided in the method according to this invention, and the result is a very dense brick having a maximum extent of true grain to grain contact which is necessary for achieving a high thermal conductivity.

It is preferred further to improve this characteristic of the brick during firing. By a relatively slow increase in temperature, e.g. a rate of 8° to 12° C. per hour between 1,300° and 1,500° C., and by holding the maximum temperature for a duration of between 35 and 45 hours, it is possible to increase the bulk density and to restrain the growth of the brick due to the conversion of the quartz. In addition this firing process results in an improved microstructure that is thought to increase the thermal conductivity.

This invention therefore also provides a method of making silica refractory bricks without the addition of heavy metal oxides, which comprises the steps of mixing granular material, containing more than 95 percent of Si $O_2$ and having a maximum grain size of about 3 mm., with a CaO in suitable form, subjecting the mixture to a pressure which increases, throughout an increase period of more than 10 seconds, to at least 700 kg. per sq. cm., and firing the compressed mixture at a temperature which increases slowly to a maximum of not less than 1,300° C. and is held at that maximum for not less than 35 hours.

The invention also includes a coke oven lined with the aforesaid refractory material.

What we claim is:
1. A method of making high conductivity silica refractory material comprising the steps of:
    a. preparing a refractory batch material consisting essentially of a granular mineral containing at least 95 percent by weight of $SiO_2$ and having a maximum grain size of about 3 mm., and no more than about 3 percent by weight of CaO,
    b. compressing the batch material with a pressure which increases for more than ten seconds to assure release of trapped air to a maximum pressure of at least 700 kg./cm.², and
    c. firing the compressed material at a temperature of at least 1,300° C. to produce a refractory material having a total porosity less than 20 percent;

2. A method according to claim 1 including the step of increasing the pressure to at least 1,000 kg./cm.$^2$ during compression of the batch material.

3. A method according to claim 1 including the steps of:
   a. increasing the temperature slowly during firing to at least 1,500° C., and
   b. maintaining the temperature at least 1,500° C. for not less than 35 hours.

4. As a wall material for a coke oven, a fired silica refractory material having a bulk density of at least 1.90 grams/cm.$^3$, a total porosity less than 20 percent, and a thermal conductivity of at least 2.0 Kilocal. per m. hr.° C. at a test temperature of 1,200° C., made from a batch consisting essentially of at least 95 percent by weight $SiO_2$ contained in granular mineral form and not more than 3 percent by weight of CaO and substantially free of porosity-reducing additives.

5. A wall material according to claim 4 having a total porosity of 18.5 to 19 percent.

6. A wall material according to claim 4 having an expansion of less than 0.5 percent after firing for several hours at 1,600° C.

7. A wall material according to claim 4 having a gas permeability of less than 5 Nanoperm.

* * * * *